(No Model.)
W. MORRISON.
ELECTRODE FOR SECONDARY BATTERIES.
No. 512,514. Patented Jan. 9, 1894.
Fig. 1.
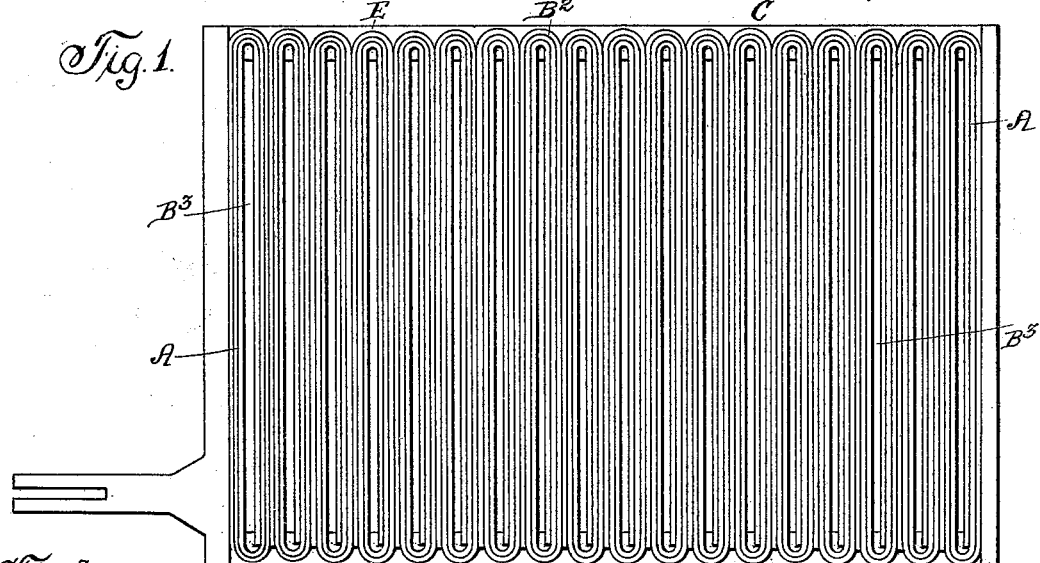
Fig. 2.
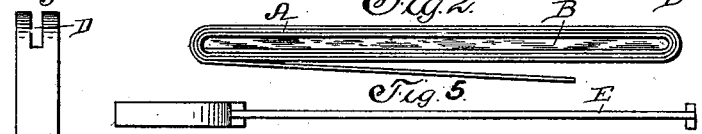
Fig. 3. Fig. 5.
Fig. 4.
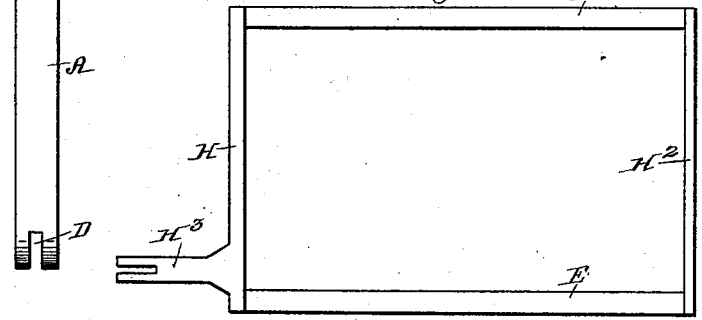
Fig. 6.
Witnesses
T. C. Tate.
G. R. Green
Inventor
William Morrison
by Charles C. Bulkley.
his Atty.

United States Patent Office.

WILLIAM MORRISON, OF DES MOINES, IOWA, ASSIGNOR TO THE AMERICAN BATTERY COMPANY, OF CHICAGO, ILLINOIS.

ELECTRODE FOR SECONDARY BATTERIES.

SPECIFICATION forming part of Letters Patent No. 512,514, dated January 9, 1894.

Application filed April 25, 1892. Serial No. 430,482. (No model.)

*To all whom it may concern:*

Be it known that I, WILLIAM MORRISON, a citizen of the United States, residing at Des Moines, in the county of Polk and State of Iowa, have invented certain new and useful Improvements in Electrodes for Secondary Batteries, of which the following is a specification.

My invention relates to that class of storage battery or voltaic accumulator known as the "Planté" type, in which type the material of the electrode is "formed" by the action of the current as contradistinguished from that class of battery in which the active material or material to become active is mechanically applied to a supporting plate or grid. In the well known secondary plate of the Planté type the material to become active consists of a solid mass of metallic lead, which is formed into a porous condition by repeated, successive and reversed primary charges, and secondary discharges, with intermediate intervals of rest, this process of formation being of long duration and expensive by reason of the amount of current necessary to complete the formation of each plate, and ultimately providing a plate capable of but a small out-put. In the well known Faure type the plate is constructed by the mechanical application of lead oxide in the form of a paste or cement, so also metallic lead and mercury in a granulated state has been mechanically applied to the supporting plate or grid, the mercury being eliminated to produce permeability or porosity, but it is well known that the greatest difficulty experienced in plates of this character arises from the scaling or falling off of the active material from the grid in the operation of the battery.

The object of my present invention is to so construct a battery plate as that the utmost extent of suface is presented to the action of the electrolyte in the operation of the battery, which plate may be formed with the utmost facility and readiness, and which shall also be of such a character as to permit free expansion in the charge and thus prevent the injurious effects incident to warping and buckling, and which shall be firmly and securely bound and held together in such a manner as that the parts thereof resist all tendency to separate under the charge.

My object further is to provide a plate which is formed practically and with expedition wholly and solely by the current of electricity, without the mechanical application of oxides to a support, frame or grid, which plate is intimately bound along its edges, and which has equal spaces extending from one side of the plate to the other, whereby ample opportunity is given for the free and equal expansion of the material in the primary charge so that the parts of the plate cannot by any possibility be severed or disjointed, these results being accomplished by means which produce a completed electrode of much less weight, and which is so produced at a materially less expense, and in addition to the other advantages enumerated also providing an electrode of maximum conductivity.

In the manufacture of electrodes of the Planté type in which the electrode is "formed" by the electric current, my invention consists first in providing suitable lengths of material to be acted upon by the current, which material is cut into strips of a ribbon or tape form, and, as a preliminary step before being secured and built up in the form of a plate or electrode, in winding said lengths of ribbon or tape of material in the form of elongated coils, in such manner as that said coils have interior spaces extending from end to end thereof, and afterward arranging a plurality or number of the coils so preliminarily constructed, side by side in the form of a plate, and then securing them at their ends firmly in a fixed position by any suitable means.

In the manufacture of electrodes of the Planté type in which the electrode is "formed" by the electric current, my invention consists further in coils or bundles of material preliminarily constructed from lengths of material cut into a tape or ribbon form and afterward built up in the form of a plate, providing spaces extending from end to end of the coils or bundles to admit of free and equal expansion in the primary charge, and in holding the ends of said coils or bundles by means of conducting rods firmly secured along or at the ends of the coils or bundles so built up in the form of a plate.

My invention consists further in certain details of arrangement and construction about to be particularly described, reference being now had to the accompanying drawings, in which—

Figure 1 is a side view of a completed electrode built up of coils of material and constructed in accordance with my improved plan. Fig. 2 is a detail view of one of the coils showing the preliminary act of winding upon a core. Fig. 3 is a view of one of the coils of the plate shown in Fig. 1, illustrating the manner in which the ends of the coils in said Fig. 1 and also the bundles in Fig. 3 are cut and slotted. Fig. 4 is a view showing the top, bottom and side conducting rods joined together. Fig. 5 is an edge view showing the manner of joining the side and top and bottom conducting rods. Fig. 6 is an edge view of the electrode shown in Fig. 1.

A, designates one of a number of coils constructed by winding a length of lead cut into the form of a ribbon or tape about a suitable core piece B, these coils being thus formed preliminary to being arranged side by side in the shape of a plate. The ends of the coils A, when arranged side by side and after removing the core piece B, present side edges $B^2$, $B^2$, of the completed electrode C, and also provide intermediate spaces $B^3$, $B^3$, extending from one side of the electrode to the other. When so arranged the ends of the coils A are slotted or grooved at D, and by reason of the disposition of said ends the slot or groove extends continuously along the side edges of the completed electrode C, side conducting rods E, E, being let into the said groove or slot D, these conducting rods being connected with top and bottom conducting rods H, $H^2$ the rod H having the terminal $H^3$. When the parts are all connected and positioned I preferably bind the edges $B^2$, $B^2$, and the conducting rods E, E, H and $H^2$ intimately and firmly together by immersing the said ends of the coils A, constituting said edges, in a suitable molten solder, it being understood however that I do not herein claim said features, the same having been described and claimed in an application, Serial No. 430,484, filed concurrently herewith, nor do I desire to be understood as limiting myself to the conducting rods or their manner of joinder with the coils or with each other, although the same constitutes a part of my invention. By this means of construction I provide an electrode for secondary batteries "formed" by the primary current, consisting in a multiplicity of leaves or strips of material so securely held as that spaces are provided extending from one side of the electrode to the other, and thus affording ample opportunity for the free expansion of the material under the charge so that the injurious results following from warping, binding and buckling are avoided, and providing a plate in which the "formation" is materially expedited, since the current enters immediately to the interior of the plate and thus shortens the time occupied in superficial attacks.

I am aware that electrodes for storage batteries of this type have heretofore been constructed in which material has been "fluted," built up into a plate, and afterward each individual and separate one of the flutes severed or cut to provide spaces, but this mode is impracticable in view of the laboriousness of the process and the length of time required to construct the plate.

Having thus described my invention, what I claim as new therein, and desire to secure by Letters Patent of the United States therefor, is—

1. As a new article of manufacture, an electrode for secondary batteries consisting of a plurality of bundles, each bundle being built up from a continuous ribbon or tape of the requisite material to become active, each bundle being provided, when in position for use, with spaces or openings extending in the direction of its length, and means for securing such bundles in place, substantially as described.

2. As a new article of manufacture, an electrode for secondary batteries, consisting of a plurality of bundles built up from a continuous ribbon or tape of the requisite material, to become active each bundle being provided with a space or opening extending longitudinally from near one end to near the other, and means for securing the bundles in place, substantially as described.

3. As a new article of manufacture, an electrode for secondary batteries, consisting of a plurality of bundles built up from a continuous ribbon or tape of the requisite material, to become active and conducting rods connecting the bundles together, substantially as described.

4. As a new article of manufacture, an electrode for secondary batteries consisting of a plurality of bundles, each bundle being built up from a continuous ribbon or tape of the requisite material to become active and being provided with notches in the ends of the material forming the bundles and conducting rods arranged in such notches to connect the bundles together, substantially as described.

WILLIAM MORRISON.

Witnesses:
CHAS. C. BULKLEY,
MARTIN P. SMITH.